United States Patent [19]

Bühler

[11] Patent Number: 5,280,153
[45] Date of Patent: Jan. 18, 1994

[54] METHOD OF AND APPARATUS FOR PULSE GENERATOR FOR ELECTRIC DISCHARGE MACHINING

[75] Inventor: Ernst Bühler, Losone, Switzerland

[73] Assignee: AGIE A.G. für industrielle Elektronik, Losone, Switzerland

[21] Appl. No.: 849,713

[22] Filed: Mar. 11, 1992

[30] Foreign Application Priority Data

Mar. 12, 1991 [DE] Fed. Rep. of Germany ....... 4107910

[51] Int. Cl.$^5$ .............................................. B23H 1/02
[52] U.S. Cl. .................................................. 219/69.18
[58] Field of Search ......................... 219/69.13, 69.18; 323/223, 282, 285, 287

[56] References Cited

U.S. PATENT DOCUMENTS

| | | | |
|---|---|---|---|
| 3,832,510 | 8/1974 | Pfau et al. | 219/69.13 |
| 4,788,399 | 11/1988 | Mironoff | 219/69.18 |
| 4,864,092 | 9/1989 | Obara | 219/69.18 |
| 4,940,872 | 7/1990 | Futamura | 219/69.13 |
| 4,967,054 | 10/1990 | Obara et al. | 219/69.13 |
| 5,083,001 | 1/1992 | Kinbara et al. | 219/69.18 |
| 5,111,017 | 5/1992 | Futamura et al. | 219/69.18 |

Primary Examiner—Geoffrey S. Evans
Attorney, Agent, or Firm—EGLI International

[57] ABSTRACT

The pulse generator for electric discharge machining contains neither load resistors nor magnetic components. The pulse current is continuously detected by a current sensor 4 and this measured value fed to a control circuit 5. Via switch elements 10, 11 and the spark-circuit inductance 3, the pulse current is developed in accordance with a desired value called for by the system connection 6. At the pulse end, the energy present in the spark-circuit inductance 3 is discharged into capacitors 37, 38 and from there recuperated in the source of dc voltage 1 or, upon the next current pulse, in the spark circuit 2, 3. This is possible with only two switch elements 10, 11. One terminal of the source of the dc voltage 1 is common with an electrode of the spark path. By means of further switch elements 12, 13, it is also possible to control the no-load voltage and/or the current impulse slope. This generator is particularly small, light and inexpensive and is of very high efficiency. It can easily be integrated in larger systems and several modules can be fed from a single source of dc voltage 1.

13 Claims, 2 Drawing Sheets

METHOD OF AND APPARATUS FOR PULSE GENERATOR FOR ELECTRIC DISCHARGE MACHINING

The present invention relates to a method of and an apparatus for pulse generator for electric discharge machining.

Background of the Invention

For new methods of electric discharge machining, system-capable flexible generator modules of small size and maximum efficiency are required. Solutions which are custom-tailored for the most different applications are to be available without great expense for development.

A step in this direction is disclosed in DE 25 47 767 (U.S. Pat. No. 4,072,842). For the first time, a purely electronic solution for the current pulse forming is disclosed. Also, a connection of a pulse generator directly to a numerical control system is disclosed.

Another pulse generator of the above type is disclosed in DE 34 19 945 (U.S. Pat. No. 4,713,516). This generator has one or more recuperation transformers for returning the energy present at the pulse end in the spark erosive circuit to the dc voltage source.

From DE 36 39 256 (U.S. Pat. No. 4,766,281) a generator is also known in which one or more intermediate storage capacitances are present which are charged to a specific voltage. The excess charge energy is returned via diodes and a transformer or an inductance to the dc voltage source.

The generator of DE 25 47 767 has the disadvantage that no way is disclosed for returning the energy of the spark erosion circuit at the ulse end to the direct voltage source. Rather, this energy is uselessly converted into heat over a load resistor. Another disadvantage is the production of high no-load voltages with a separate generator having load resistors and separate dc voltage source. Thus, the generator is not of particular interest because of its efficiency, flexibility in use, or smallness in size. The generator in accordance with DE 34 19 945 has, in principle, a high efficiency. However, it has been found that it is very difficult to construct a recuperation transformer which is so well coupled that only permissible voltage peaks occur on the switch elements. Another serious problem is the magnetization current which is always present and the danger of saturation of the magnetic circuit by longer pulses. Solutions of this kind are therefore characterized by disproportionately high costs of manufacture and excessive structural size. This type of generator has therefore been used only for high-current short pulses with pulse flanks of up to 500 A/$\mu$s.

Solutions in accordance with DE 36 39 256 are also suitable only for high-current short pulses and, to be sure, even higher currents of up to 1,000 amperes. They are thus of interest only for electron discharge drilling and wire cutting. This type of generator is at most suitable for integration with the generator of the invention in a system in order to carry out, combined with it, drilling, cutting and counterboring work. Such a combined system is disclosed in DE 38 32 002 (U.S. Pat. No. 4,764,653).

SUMMARY OF THE INVENTION

The object of the present invention is to improve the known pulse generators. A further object is to increase the pulse generators' efficiency with simultaneous reduction of their structural size and cost of manufacture. The pulse parameters are to be programmable within wide limits and, in the same way, to make possible simple system integration.

These, and other objects are achieved by a pulse generator for electric discharge machining, including a current sensor, a dc voltage source having a first terminal and a second terminal, the first terminal being connected to a spark gap, a first switch element which connects the second terminal of the dc voltage source to the spark gap, recovery diode, a second switch element which connects the recovery diode in parallel to the spark gap; and a control circuit having system connection means for connecting the control circuit to an external overriding control system, the system connection means outputting control signals, the control circuit controlling the first and second switch elements as a function of the control signals of the system connection and a measured value of the current sensor so that after a disconnection of the switch elements, energy stored in a spark-circuit inductance, formed of stray inductance of the pulse generator, wiring and electric machine discharge is transmitted temporarily into a capacitor via the recovery diode and a charge diode, and so that upon a next connection of the two switch elements, the energy is again fed to the spark gap and the spark-circuit inductance over the switch elements and at least one recuperation diode.

The advantage of the invention is, in particular, that the circuits can be built particularly small, light and economical in cost. For instance, a 30-A sink generator with 100 volt no-load voltage can be conveniently arranged on an ordinary double European size insert card. A 10 A firing stage with, for instance, 100 V, 200 V and 300 V no-load voltage can be constructed in similar size. These pulse generators can be combined with known special high-energy generators (DE 36 39 256). A single source of direct voltage is sufficient for the feeding of all generators.

BRIEF DESCRIPTION OF THE DRAWINGS

The following embodiments of the invention will be described in further detail with reference to the drawing, in which.

DETAILED DESCRIPTION OF THE PREFERRED EMBODIMENTS

Figure 1:
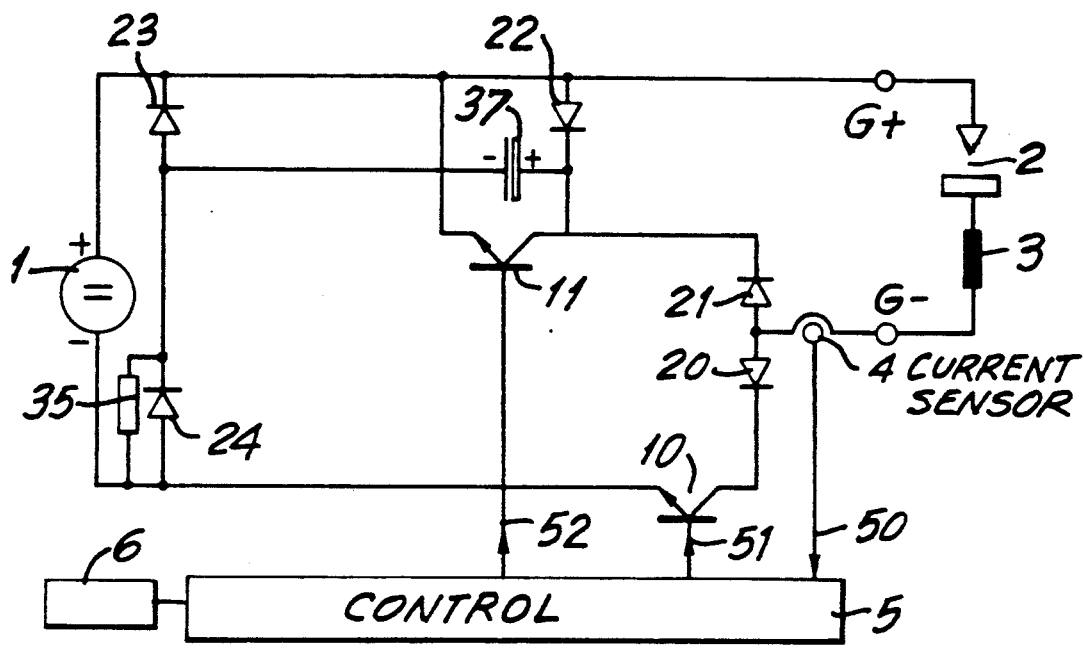
FIG. 1 shows a first embodiment of a pulse generator with pulse rise and pulse fall flanks of approximately the same steepness.

FIG. 1 shows the simplest embodiment of the pulse generator proposed. A dc voltage source 1 is connected with a polarity, normally the positive terminal, via the first generator output G+, directly to the first electrode of the spark gap 2. The electric discharge machine and its wiring as well as the pulse generator itself have a resultant stray inductance indicated as spark-circuit inductance 3. This spark-circuit inductance 3 is sufficient in most cases to limit the steepness of the pulse and modulate any desired shape of pulse via the switch elements 10, 11. With too small a spark-circuit inductance 3, it may be necessary to insert an additional inductance, for instance, between the current sensor 4 and the second generator output G−. The current sensor 4 must be able to detect the pulse current in real time since it must supply the actual current value 50 to a current-regulating circuit of the control circuit 5.

For the current sensor 4, reference is had to DE 34 05 442, and for the control circuit 5 to the aforementioned DE 25 47 767. However, it is clear that, in the present state of the art, the control circuit 5 will be made practically completely by gate array technology. For this, there enter into consideration, for example, programmable gate array components of the XC 3000 family of the XILINX company, San Jose, USA. It is furthermore necessary for the control outputs 51, 52, 53, 54 of the switch elements 10, 11, 12, 13 to be galvanically separated.

This control technique is well documented in the following three publications:
 ALOISI, "TOUT savoir sur le mosfet de puissance" ("All you want to know about the power mosfet"), pp. 51 to 64, 1990, Motorola, Toulouse (F).
 HAESSIG, "Zuverlässiger Betrieb von Mosfets" ("Reliable operation of mosfets"), pp. 55 to 63, 1989, Zeitschrift Elektronik May 10/12 (D).
 GLOGOLJA, "Schalten hoher Spannungen mit SIPMOS" ("Switching of high voltages with SIPMOS"), 1986, Siemens Components 24, No. 4, pp. 132 to 136 (D).

The control circuit 5 furthermore has a system terminal 6. This is a standard bi-directional interface to an overriding control system, such as described, for instance, in DE 36 40 987 (U.S. Pat. No. 4,903,213).

Upon the connecting of the dc source 1, the capacitance 37 is charged via a start up diode 22 and a first charge resistor 35 within, for instance, one second, to the voltage value of the source of dc voltage 1. The charge resistor 35 does not cause any substantial loss of power (less than 1 W).

A current pulse is now called for via the control circuit 5. For this purpose, the first switch element 10 is connected via the control output 51. In this way, the second generator output G− is connected to the second pole (−) of the source of dc voltage 1 via the current sensor 4, the decoupling diode 20, and the first switch element 10. The further events depend now on the condition of the spark gap 2. If it is without load, the no-load voltage is formed over it in a value equal to that of the dc voltage source 1. Upon firing, or else upon short circuit of the spark gap 2, a pulse current commences to flow having a rise flank steepness that is proportional to the resultant voltage drop over the spark circuit inductance 9 and inversely proportional to its inductance value.

Within the control circuit 5 the actual current value 50 which is transmitted by the current sensor 4 is now continuously compared with a desired current value which is demanded by the system connection 6. If the value of the desired current minus the existing current is negative, then the second switch element 11 is connected and the first switch element 10 then disconnected. In this way, the source of direct voltage 1 is separated from the spark circuit 2, 3, and the spark-circuit inductance 3 now enters into action as source of energy in the manner that it maintains the pulse current via the current sensor 4, the recovery diode 21, the second switch element 11 and the spark gap 2 in a flatly falling course of the current. This falling steepness is proportional to the resultant voltage of the pulse current circuit 4, 21, 11, 2 and inversely proportional to the value of the spark-ciruit inductance 3.

If the result of the comparison in the control circuit 5 now again becomes positive as a result of the falling actual current value 50, then the first switch element is again connected via the control output 51 and the cycle commences all over again. It may be mentioned that the desired current value can be changed via the system connection 6 also during a pulse. Due to the comparison between the desired value and the actual value, the pulse current in the spark circuit 2, 3 will follow this desired-value pattern within the possibilities limited by the flank steepness.

At the end of the pulse, the desired current value is placed at zero or even at a negative value by the system connection 6, as a result of which the two switch elements 10, 11 are disconnected via the control outputs 51, 52. There is now only left the possibility for the pulse current of flowing over the current sensor 4, the recovery diode 21, the capacitance 27, a charge diode 23 and the spark gap 2. Since, however, the capacitance 37 has already been charged to the value of the source of dc voltage 1, the magnetic energy present in the spark circuit inductance 3 is recharged very rapidly in the form of electrical energy into the capacitance 37.

The capacitance 37 is so dimensioned that the increase in voltage is less than about 10% and typically about 1%. It is now seen that the falling pulse current flank, even in the event of a short circuit in the spark gap 2, has at least the same steepness as the rising current flank. There are, in principle, two possibilities for recovering the energy which has been provisionally stored in the capacitance 37. Either the second switch element 11 is connected after the fading away of the pulse current but still during the pulse pause, whereby a recuperation current can flow back into the source of the voltage 1 via a recuperation diode 24, the capacitance 37 and the second switch element 11. As soon as the capacitance 37 has again reached the voltage value of the source of dc voltage 1, this recuperation current disappears.

The second possibility consists in waiting with the recuperation until the next pulse. If both switch elements 10, 11 are then connected, the pulse current flows out of the capacitance 37 via the second switch element 11, the spark gap 2, the spark-circuit inductance 3, the current sensor 4, the decoupling diode 20, the first switch element 10 and the recuperation diode 24.

In the case of the first possibility, the energy serves exclusively for the dc voltage source 1 and in the case of the second possibility, predominantly for the spark gap 2. The nature of the recuperation can, of course, be determined via the system connection 6 and depends on the operating conditions. With sequential control of several circuits in accordance with FIG. 1, use will advantageously be made, for instance, of the first possibility.

For a 30 A generator with 100 V no-load voltage with a typical value of 100 µF the capacitance 37 would have a weight of 14 g and a volume of 12 ml and would cost about $1.00. A recuperation transformer for the same generator, on the other hand, weighs 450 g and has a volume of 250 ml and costs about $25.00. In addition to this, the recuperation transformer induces additional over-voltage peaks on the switch elements 10, 11 of more than 130 V, which, with the circuit in accordance with FIG. 1, with good printer circuit wiring, is less than 10 V. This shows the enormous advantages of this circuit.

Figure 2:
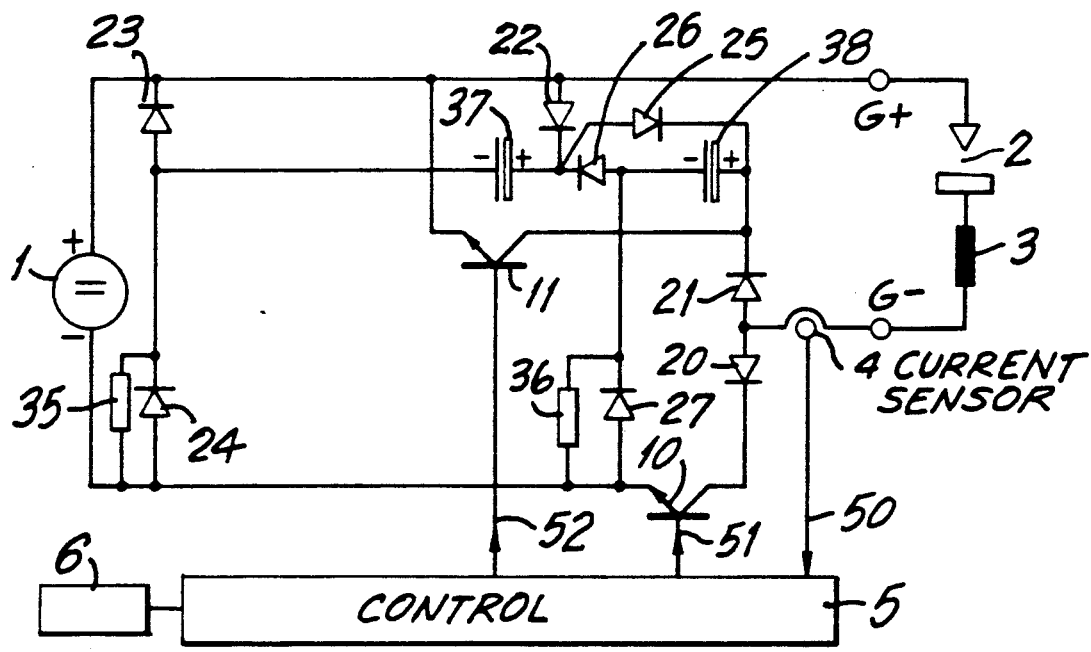
FIG. 2 shows a second embodiment of a pulse generator with pulse fall flanks which are approximately twice as steep as the pulse rise flanks.

FIG. 2 shows an embodiment which corresponds in its manner of operation to the embodiment shown in FIG. 1. However, the circuit is supplemented by a second capacitance 38, a series charge diode 26, second and third recuperation diodes 25, 27 and a second charge resistor 36. This arrangement produces twice the steepness of the falling pulse current flank. The reason for this is the doubling of the voltage in the free-running circuit 21, 38, 26, 37, 23 after the disconnecting of the two switch elements 10, 11 as a result of the series connection of the two capacitors 37, 38. In the recuperation process, the two capacitors 37, 38 are connected in parallel via the switch elements 10, 11 and the recuperation diodes 24, 25, 27 of the source of dc voltage 1 respectively to the spark circuit 2, 3 and again discharged to the value of the source of dc voltage 1. In the same way, of course, the voltage in the free-running circuit, and thus the speed of disconnection of the pulse current, could be further increased by repeated insertion of further circuits 25, 26, 27, 36, 38. The switch elements 10, 11 would in such case, however, have to be designed for the higher voltage. A steep falling flank of about at least 10 A/μs and more is very important for an effective removal of the erosion particles from the crater zone of the spark gap 2 and thus important for a high removal output.

FIG. 3 is again expanded, namely by the voltage doubling circuits 13, 30, 40, 12, 28, 39. This embodiment is adapted to produce no-load voltages which correspond to a multiple of the voltage value of the dc voltage source 1. Similarly, it is possible, if the switch elements 12, 13 are connected only after the firing of the spark gap 2, to make the rising pulse current flank steeper by a multiple than would be the case only with the source of dc voltage 1.

In this case also, upon the connecting of dc voltage 1, the capacitors 40, 39 are charged to the voltage value of the source of dc voltage 1 over another charge resistor 41, two charge diodes 31, 29 and the shunt diodes 30, 28. If now, at a suitable time, the switch elements 13, 12 are connected over the control outputs 54, 53, then the capacitors 40, 39 can be connected individually or simultaneously in series to the source of dc voltage 1. This has the result that the first switch element 10 can now switch several times the voltage value of the source of dc voltage 1 to the spark circuit 2, 3.

The capacitors 40, 39 are charged via two charge diodes 31, 29 in each case again to the voltage value of the source of dc voltage 1 upon the connecting of the second switch element 11. The second switch element 11, for this purpose, has another recuperation diode 32 connected in series. The switch elements 13, 12 therefore must never be connected here simultaneously with the second switch element 11, since in such case the source of dc voltage 1 would be short-circuited over the start diode 22, the second recuperation diode 25 and the charge diodes 31, 29, as well as the shunt diode 30.

For the connection of the charge diodes 31, 29 there are also alternative possibilities.

One can, for instance, connect the anode of the charge diode 31 to the anode of the charge diode 23. The anode of the charge diode 29 could be connected to the anode of the recovery diode 21. In such case, the capacitance 40 would also be charged to the value of the source of dc voltage 1. The capacitance 39, on the other hand, would be charged to three times the value of the source of dc voltage 1. One would thus have a maximum no-load voltage of five times the value of the source of dc voltage 1 if the switch elements 10, 12, 13 were connected simultaneously. The most different combinations and syntheses of FIGS. 1, 2 and 3 are, of course, conceivable.

It is also possible to provide only one voltage doubling circuit 13, 30, 40, or even more than two of them. One interesting alternative consists in selecting the voltage of the source of dc voltage 1 just so high that it corresponds to the maintaining voltage over the spark gap 2 plus the voltage drops over the diodes 20, 28, 30, as well as the first switch element 10. This has the result that the current rise flank, when the first switch element 10 is connected, just becomes horizontal. In this way, one can produce long pulses of constant amplitude without frequent switching processes. The rising pulse flank is then produced by the voltage doubling circuits 13, 30, 40, 12, 28, 39. The falling pulse flank results from the disconnecting of all switch elements 10, 11, 12, 13.

Since the first terminal (+) of the dc voltage source 1 is connected directly to the first generator output G+, the dc voltage source 1 can be common to several pulse generators. If switch elements were present in this connection, undefined conditions would result upon the connection in parallel of several pulse generators. This danger does not exist in the case of the second generator output G−, since the current sensor 4 would immediately detect an undefined deviation. In the case of several pulse generators, it is advantageous to develop the wiring between pulse generator and spark gap 2 separately for each module. There is thus produced a spark-circuit inductance also per module, which reduces the mutual influencing of the pulse generators to a large extent.

Figure 3:
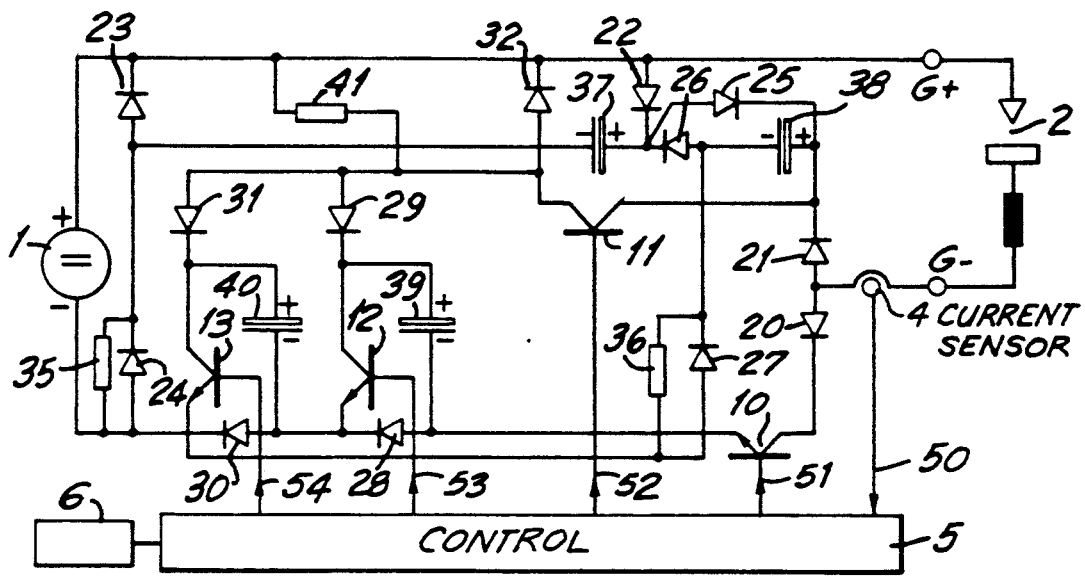
FIG. 3 shows a third embodiment of a pulse generator with programmable no-load voltage and programmable pulse-rise steepness.
Figure 4:
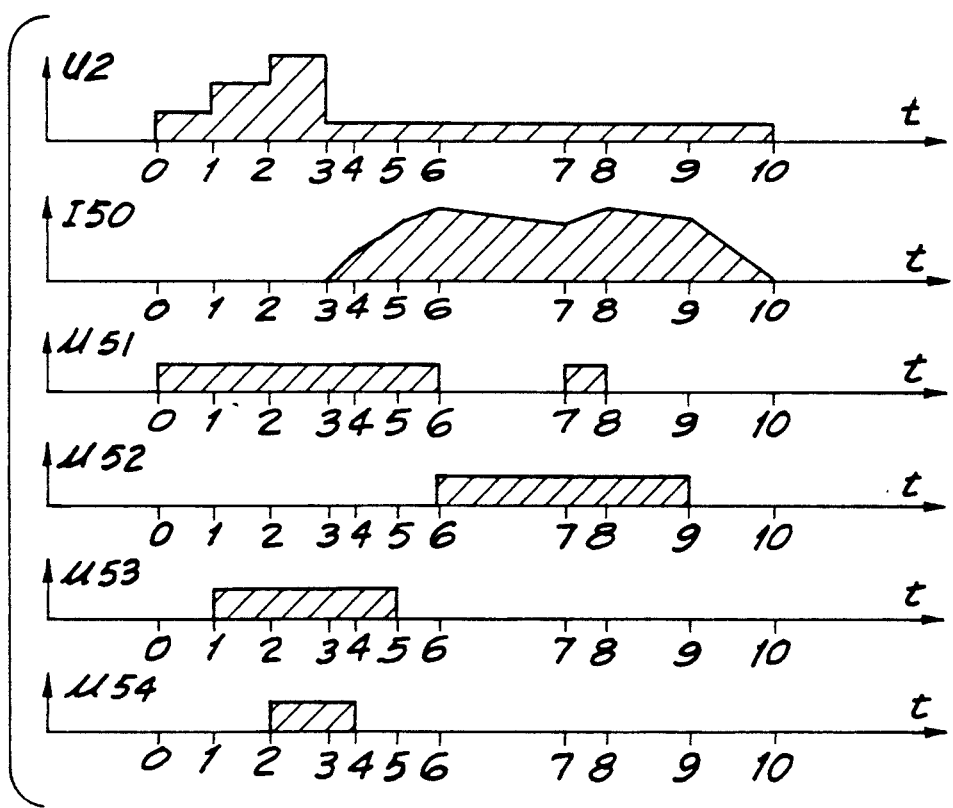
FIG. 4 is a time graph of a few signals of the pulse generator of FIG. 3.

FIG. 3 shows signal curves U2, I50, U51, U52, U53, U54 as a function of the time t. U designates a voltage signal, I a current signal, and the following number refers in each case to the reference number in FIG. 3.

It is assumed here that at the time t=0, the spark gap 2 is in insulated (not-conducting) condition and the switch element 10 is connected via the control output 51. Accordingly, the no-load voltage U2 appears in the amount of the value of the dc voltage source of for instance 100 V over the spark gap 2. At the time t=1, the switch element 12 is additionally connected over the control output 53. In this way, the capacitance 39 is switched in series to the voltage source 1, as a result of which the no-load voltage U2 is increased to 200 V. At the time t=2, the switch element 13 is also connected over the control output 54. The no-load voltage U2 thus increases to 300 V.

It is now assumed that at the time t=3, the spark gap 2 ignites and a maintaining voltage U2 of typically 25 V is established. The pulse current I50 now starts to rise linearly, in proportion to the voltage of about 275 volts over the spark-circuit inductance 3, which amounts, for instance, to about 10 μH. At the time t=4, the switch element 13 is disconnected over the current output 54, whereby the pulse current I50 now rises further proportionally to 175 V. At the time t=5, the switch element 12 is also disconnected via the control output 53 and the pulse current I50 now increases still only proportional to 75 V. At the time t=5, the second switch element 11 is connected over the control output 52 in order to close the free-running circuit 21, 11, 32, and the first switch element 10 is disconnected via the control output 51. The spark gap 2 is now supplied with energy from the spark-circuit inductance 3 and the pulse current I50 decreases proportional to the maintaining voltage of 25 V. Between the times t=7 and t=8, the first switch element 10 is then again closed, whereby the pulse current I50 again rises proportional to 75 V. Finally, at the time t=9, the second switch element 11 is also disconnected and the pulse current I50 now drops steeply proportional to the sum of the voltages over the capacitors 37, 38 and the spark gap 2 and therefore 225 V.

At the time t=10, the energy in the spark circuit inductance 3 is exhausted, the pulse current I50 becomes zero and the spark discharge is completed. The switch elements and diodes were assumed here to be ideal, but actually their voltage drops, even though small, must be taken into account.

The control circuit 5, during the operation of the generator, receives in principle all information which is necessary in order to control a servo system for the electrode movements and possibly an adaptive parameter control system. More detailed information concerning this method can be noted from the aforementioned DE 245 47 767, read in conjunction with FIG. 8. The analog circuit in that case can, of course, easily be copied digitally or else be replaced by a software routine.

For the switch elements 10, 11, 12, 13 the power Mosfets, which are now of low price, stand in the foreground. However, bipolar power transistors or the more recent IGBT's and the like can also be used. The only requirement is a sufficiently high switching speed and the possibility of a controlled disconnection.

I claim:

1. A pulse generator for electric discharge machining, comprising:
   a current sensor (4) for sensing current through a spark gap;
   a dc voltage source (1) having a first terminal and a second terminal, the first terminal being connected to the spark gap (2);
   a first switch element (10) which connects the second terminal of the dc voltage source (1) to the spark gap (2);
   a recovery diode (21);
   a second switch element (11) which connects the recovery diode (21) in parallel to the spark gap (2); and
   a control circuit (5) having system connection means for connecting said control circuit to an external overriding control system, said system connection means outputting control signals, said control circuit (5) controlling the first and second switch elements (10, 11, 12, 13) as a function of the control signals of the system connection (6) and a measured value of the current sensor (4) so that after a disconnection of the switch elements (10, 11), energy stored in a spark-circuit inductance (3), formed of stray inductance of the pulse generator, wiring and electric discharge machine is transmitted temporarily into a capacitor (37) via the recovery diode (21) and a charge diode (23), and so that, upon a next connection of the two switch elements (10, 11), the energy is again fed to the spark gap (2) and the spark-circuit inductance (3) over the switch elements (10, 11) and at least one recuperation diode (24, 32).

2. A pulse generator according to claim 1, wherein at least one second capacitor (38) is switched in series to the capacitor (37) over at least one series charge diode (26), and wherein, after the disconnection of the switch elements (10, 11), the energy stored in the spark-circuit inductance (3) is transmitted serially into the capacitor (37) and said at least one second capacitor (38) over the recovery diode (21), the at least one series charge diode (26) and the charge diode (23), and upon a next connection of the two switch elements (10, 11), this energy is fed again in parallel to the spark gap (2) and the spark-circuit inductance (3) over the switch elements (10, 11), the recuperation diode (24) and at least one second recuperation diode (25, 27, 32).

3. A pulse generator according to claim 2, wherein the capacitors (37, 38) are arranged si that energy transferred into them solely by connection of the second switch element (1) is fed back into the dc voltage source (11) after a fading away of pulse current over the recuperation diodes (24, 25, 27, 32) and the second switch element (11).

4. A pulse generator according to claim 2, wherein the capacitors (37, 38) are arranged so that, upon connection of the dc voltage source (1), over in each case a charge resistor (35, 36), a start-up diode (22) and at least one second recuperation diode (25) are charged to the voltage value of the dc voltage source (1) and the capacitors (37, 38) are dimensioned so that this voltage value is changed by less than about 10% as a result of a temporary storage of energy.

5. A pulse generator according to claim 1, wherein between the first switch element (10) and the second terminal of the dc voltage source (1), at least one voltage doubling circuit is connected in series and has capacitors (39, 40) that are charged up to the voltage value of the dc voltage source (1) over the recovery diode (21), the second switch element (11), charge diodes (31, 29) of the at least one doubling circuit and shunt diodes (28, 30) of the at least one doubling circuit.

6. A pulse generator according to claim 5, wherein a further charge resistor (41) is provided so that the dc voltage source (1) and the capacitors (39, 40) of the at least one voltage doubling circuit are connected so that the capacitors (39, 40) are charged via said further charge resistor (41) and the shunt diodes (28, 30) to the voltage value of the dc voltage source (1).

7. A pulse generator according to claim 5, wherein connection of a combination, selected via the system connection means (6), of the first switch element (10) and switch elements (12, 13) of the at least one voltage doubling circuit before firing of the spark gap (2), determines a no-load voltage over the spark (2).

8. A pulse generator according to claim 5, wherein connection of a combination, selected via the system connection means (6), of the first switch element (10) and switch elements (12, 13) of the at least one voltage doubling circuit, after firing of the spark gap (2), determines steepness of a rise of the pulse current.

9. A pulse generator according to claim 5, wherein the source of dc voltage (1) has a voltage valve that is selected on an order of magnitude of a sum of a maintaining voltage of the spark gap (2) and voltage drops over the first switch element (10) and the shunt diodes (28, 30).

10. A pulse generator according to claim 1, wherein firing time of the spark gap (2) is determined via a measurement of pulse current by the current sensor (4) and a comparison thereof with a threshold value in the control circuit (5).

11. A pulse generator according to claim 10, wherein the control circuit reports the measured values of the pulse current and the firing times, as well as information on the state of the system, back to the system connection (6).

12. A pulse generator according to claim 1, wherein a plurality of pulse generators are connected to a single source of direct voltage (1).

13. A method of generating pulses for a pulse generator for electric discharge machining, comprising the steps of:

providing a current sensor (4) for sensing current through a spark gap;

providing a source of dc voltage (1);

connecting a first terminal of the dc voltage source to the spark gap (2);

providing a second switch element (11) for connecting a recovery diode (21) in parallel to the spark gap (2); and providing a control circuit (5) having system means outputting control signals and connecting the control circuit to an overriding control system, said control circuit controlling the switch elements (10, 11, 12, 13) as a function of the control signals of a system connection means (6) and a measured value of the current sensor (4) so that after disconnecting the switch elements (10, 11), energy stored in a spark-circuit inductance (3), formed of stray inductance of the pulse generator, wiring and electric discharge machine, is temporarily transferred into a capacitor (37) via the recovery diode (21) and a charge diode (23) and so that upon a next connecting of the two switch elements (10, 11), this energy is again fed via the switch elements (10, 11) and at least one recuperation diode (24, 32), to the speak gap (2) and the spark-circuit inductance (3).

* * * * *